(12) United States Patent
Wan et al.

(10) Patent No.: US 10,511,803 B2
(45) Date of Patent: Dec. 17, 2019

(54) VIDEO SIGNAL TRANSMISSION METHOD AND DEVICE

(71) Applicant: SHENZHEN SKYWORTH-RGB ELECTRONIC CO., LTD., Shenzhen, Guangdong (CN)

(72) Inventors: Qiao Wan, Guangdong (CN); Minghuo Yu, Guangdong (CN); Jian Yang, Guangdong (CN); Zhaobin Wu, Guangdong (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 16/331,533

(22) PCT Filed: Dec. 22, 2017

(86) PCT No.: PCT/CN2017/118005
§ 371 (c)(1),
(2) Date: Mar. 8, 2019

(87) PCT Pub. No.: WO2018/192253
PCT Pub. Date: Oct. 25, 2018

(65) Prior Publication Data
US 2019/0208161 A1 Jul. 4, 2019

(30) Foreign Application Priority Data
Apr. 18, 2017 (CN) .......................... 2017 1 0255606

(51) Int. Cl.
*H04N 7/01* (2006.01)
*H04N 5/14* (2006.01)
*H04N 7/10* (2006.01)

(52) U.S. Cl.
CPC .......... *H04N 7/0125* (2013.01); *H04N 5/145* (2013.01); *H04N 7/0102* (2013.01); *H04N 7/10* (2013.01)

(58) Field of Classification Search
CPC ...... H04N 7/0125; H04N 7/0102; H04N 7/10; H04N 5/145
See application file for complete search history.

(56) References Cited

U.S. PATENT DOCUMENTS 5,631,712 A * 5/1997 Suh .......................... H04N 5/44
  348/705
6,069,663 A * 5/2000 Bessel .................... G09G 1/167
  348/441

(Continued)

FOREIGN PATENT DOCUMENTS

CN   1914660 A    2/2007
CN   103347163 A  10/2013

(Continued)

OTHER PUBLICATIONS

International Search Report of PCT Patent Application No. PCT/CN2017/118005 dated Mar. 28, 2018.

*Primary Examiner* — Jefferey F Harold
*Assistant Examiner* — Mustafizur Rahman

(57) ABSTRACT

The disclosure discloses a video signal transmission method, the method includes the following operations: acquiring a target video signal, decoding the target video signal, and dividing the decoded target video signal into a preset number of video signal groups according to a preset strategy; transmitting the video signal groups to a signal processor, and controlling the signal processor to process the video signal groups; transmitting the processed video signal groups to the display terminal to display each group of video signal of the processed video signal groups in a corresponding area of the display terminal. The disclosure also discloses a video signal transmission device.

10 Claims, 12 Drawing Sheets

(56) References Cited

U.S. PATENT DOCUMENTS

| | | | |
|---|---|---|---|
| 9,749,578 B1* | 8/2017 | Liu | H04N 7/0127 |
| 2002/0101536 A1* | 8/2002 | Cook | H04N 9/641 |
| | | | 348/453 |
| 2004/0017478 A1* | 1/2004 | Cooper | H04N 7/183 |
| | | | 348/207.99 |
| 2010/0165117 A1* | 7/2010 | Kim | G06T 1/00 |
| | | | 348/207.1 |
| 2011/0206130 A1* | 8/2011 | Koto | H04N 19/61 |
| | | | 375/240.21 |
| 2012/0287345 A1* | 11/2012 | Lien | H04N 7/108 |
| | | | 348/723 |
| 2015/0326846 A1* | 11/2015 | Stec | H04N 21/816 |
| | | | 348/43 |
| 2016/0150275 A1* | 5/2016 | Roychowdhury | |
| | | | H04N 21/43637 |
| | | | 725/14 |
| 2016/0165275 A1* | 6/2016 | Yamashita | H04N 21/4363 |
| | | | 348/441 |

FOREIGN PATENT DOCUMENTS

| | | |
|---|---|---|
| CN | 103561227 A | 2/2014 |
| CN | 103595896 A | 2/2014 |
| CN | 105407252 A | 3/2016 |

* cited by examiner

VIDEO SIGNAL TRANSMISSION METHOD AND DEVICE

FIELD OF THE DISCLOSURE

The present disclosure relates to the field of video signal transmission, and in particular, relates to a video signal transmission method and device.

BACKGROUND OF THE DISCLOSURE

With development of smart television and increasing demand of people for video and audio experience, television products with large size and high definition resolution appear. Due to the ultra-high resolution of large-size television, it will bring the audience an immersive feeling and enjoyment when watching the images. However, there are also some problems on the other hand. For example, when watching 8K movies through 8K ultra-high definition television, video signal from 8K image sources cannot be transmitted due to the limitation of transmission line bandwidth of display input and output signal, as a result, image details of the video is lost and the images cannot be truly restored, which has become a shortcoming of the ultra-high definition television.

SUMMARY OF THE DISCLOSURE

The main purpose of the present disclosure is to solve the technical problem in the prior art that high-bandwidth video signal data cannot be transmitted through low-bandwidth signal lines.

In order to achieve the above object, the present disclosure provides a video signal transmission method, including:

acquiring a target video signal, decoding the target video signal, and dividing the decoded target video signal into a preset number of video signal groups according to a preset strategy;

transmitting the video signal groups to a signal processor, and controlling the signal processor to process the video signal groups;

transmitting the processed video signal groups to a display terminal to display each group of video signal of the processed video signal groups in a corresponding area of the display terminal.

Optionally, the operation of acquiring a target video signal, decoding the target video signal, and dividing the decoded target video signal into the preset number of video signal groups according to the preset strategy includes:

acquiring a target video signal, decoding the target video signal;

dividing the decoded target video signal into the preset number of video signal groups in the format of YCbCr422 according to a preset strategy.

Optionally, the operation of transmitting the video signal groups to a signal processor, and controlling the signal processor to process the video signal groups includes:

transmitting the video signal groups to a signal processor;

enabling a preset transmission format conversion chip to convert the existing transmission format of the video signal groups into a preset transmission format.

Optionally, the operation of enabling preset transmission format conversion chip to convert the existing transmission format of the video signal groups into a preset transmission format, the method includes:

determining the type of display, and judging whether motion compensation processing is required for the video signal groups according to the display type.

Optionally, the operation of determination of the type of display and judging whether motion compensation processing is necessary for the video signal groups according to the display type, the method includes:

when motion compensation processing is required for the video signal groups, enabling the preset MEMC motion compensation chip to perform motion compensation processing on the video signal groups.

In addition, in order to achieve the above object, the present disclosure also provides a video signal transmission device, including:

a dividing module, configured to acquire a target video signal, decode the target video signal, and divide the decoded target video signal into a preset number of video signal groups according to a preset strategy;

a processing module, configured to transmit the video signal groups to a signal processor, and control the signal processor to process the video signal groups;

a displaying module, configured to transmit the processed video signal groups to a display terminal to display each group of video signal of the processed video signal groups in a corresponding area of the display terminal.

Optionally, the dividing module includes:

an acquiring unit, configured to acquire a target video signal and decode the target video signal, a dividing unit, configured to divide the decoded target video signal into the preset number of video signal groups in the format of YCbCr422 according to the preset strategy.

Optionally, the processing module includes:

a transmission unit, configured to transmit the video signal groups to a signal processor;

a conversion unit, configured to enable a preset transmission format conversion chip to convert the existing transmission format of the video signal groups into a preset transmission format.

Optionally, the processing module further includes:

a judging unit, configured to determine the type of the display, and judging whether motion compensation processing is required for the video signal groups according to the display type.

Optionally, the processing module further includes:

a compensation processing unit, configured to enable the preset MEMC motion compensation chip to perform motion compensation processing on the video signal groups, when motion compensation processing is required for the video signal group.

According to the disclosure, after acquisition of the target video signal, the target video signal is divided into a preset number of video signal groups according to a preset strategy, so that each group of video signal may be transmitted through the existing video signal transmission mode, Thereby the transmission of high-bandwidth video signal through low-bandwidth signal transmission lines is implemented, and integrity of the video signal in the transmission process is ensured, making display image clear and smooth, detail display perfect, and bringing to audience an excellent viewing experience.

The implementation, functional features and advantages of the present disclosure will be further described with reference to the drawings in combination with the embodiments.

DETAILED DESCRIPTION OF THE EMBODIMENTS

It should be understood that the specific embodiments described herein are only for the purpose of explaining the present disclosure and are not intended to limit the present disclosure.

The present disclosure provides a video signal transmission method.

Figure 1:
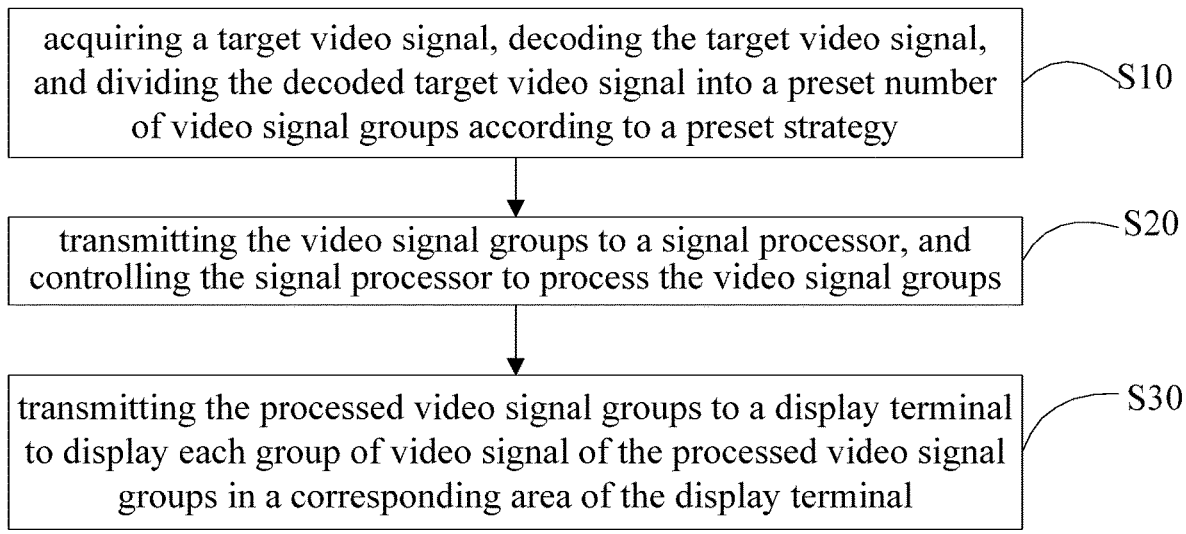
FIG. 1 is a flowchart of the video signal transmission method according to an embodiment of the present disclosure.

Referring to FIG. 1, FIG. 1 is a flowchart of the video signal transmission method according to an embodiment of the present disclosure.

In this embodiment, the video signal transmission method includes:

Operation S10, acquiring a target video signal, decoding the target video signal, and dividing the decoded target video signal into a preset number of video signal groups according to a preset strategy;

In this embodiment, the target video signal refers to the ultra-high definition image source corresponding to ultra-high definition television UHDTV, such as, a standard 8K image source in the format of HEVC video compression. Ultra-high definition television refers to that according to the proposal of "Ultra-high definition television UHDTV" issued by the International Telecommunication Union (ITU) in May 2012, television with screen physical resolution of 3840×2160 (4 k×2 k) and television with screen physical resolution above 3840×2160 (4 k×2 k) are called Ultra-high definition television. Dividing the decoded target video signal into a preset number of video signal groups according to a preset strategy. The decoded target video signal may be divided into any number of groups without restrictions here, 4 channels for instance, making the code stream rate of each channel lower than the maximum code stream transmission rate specified by the present transmission protocol (e.g., the specified maximum code stream transmission rate of HDMI 2.0 and V-BY-ONE interface). Since human eyes are more sensitive to luminance signal than chrominance signal (Cb, Cr), On the premise that the video details are retained at maximum, according to the sampling ratio of Y:Cb:Cr=4:2:2 resample and convert the video signal in the original RGB 444 format into video signal in YCbCr 422 format in the decoder. That is, 8K video signal in the original RGB444 format is processed to obtain 4 channels of video signal in YCbCr 422 format (or the original format may not be converted, retaining the original format RGB444).

In this embodiment, flag bits may also be added to the head and tail of each image block during dividing the image signal. In the process of signal transmission to the display after divided, the transmission flag bits of image blocks are monitored in real time, If there exist the head and tail flag bits of each image, it indicates that no data is lost during signal transmission. If the date is lost, judging whether the number of lost picture frames exceeds a certain value. this value may be judged according to actual needs, For example, when the display is 8K 120 fps, if the number of lost picture frames is less than 120 frames, the influence of the frame picture loss on the video signal playing may be ignored. If the picture frame number of the lost picture is more than 120, it is judged that it will affect the playing image at this situation. Users may be informed by some certain form to check possible problems in the transmission line or other transmission. For example, display a picture after loss of picture frame (i.e. no video signal picture) on the screen to prompt the user that there is a problem in the current video signal transmission and to remind the user to repair the line.

Figure 2:
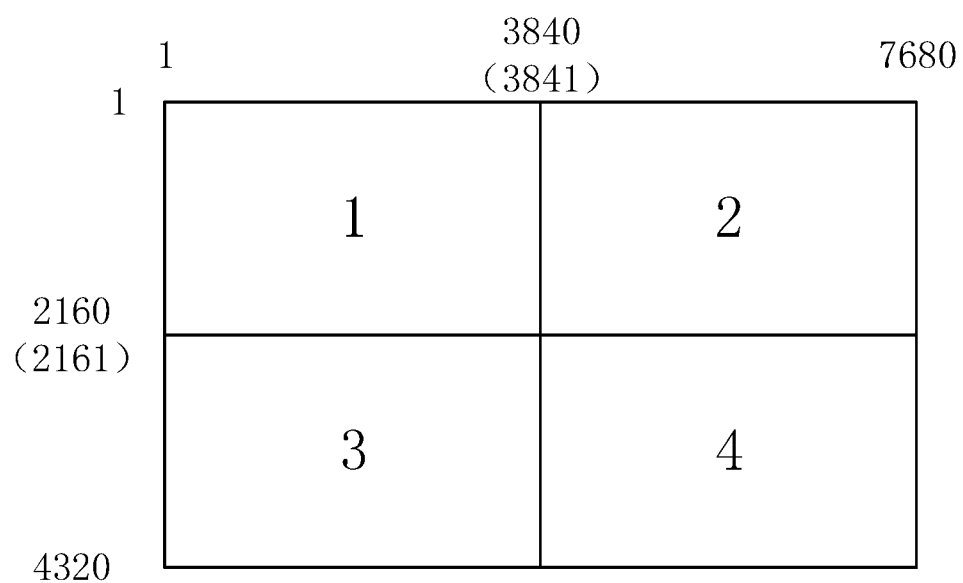
FIG. 2 is a diagram of dividing video signal according to an embodiment of the present disclosure.

In this embodiment, there is no restriction on signal dividing of image source. The code stream rate of each line after dividing is lower than the maximum code stream rate specified in present interface specifications (e.g., HDMI 2.0, V-BY-ONE). In an alternative embodiment, as shown in FIG. 2, FIG. 2 is a diagram of dividing video signal according to an embodiment of the present disclosure. 8 k 60 fps ultra-high definition video is decoded by an 8 k decoding module and then divided into 4 channels of RGB 444 format video signal and synchronous clock signal for separate transmission. The first channel is a rectangular area composed of columns 1 to 3840 and rows 1 to 2160 in a frame image, as well as row and field synchronization signal. The second channel is a rectangular area composed of columns 3841 to 7680 and rows 1 to 2160 in a frame image, as well as row and field synchronization signal. The third way is a rectangular area composed of columns 1 to 3840 and rows 2161 to 4320 in a frame image, as well as row and field synchronization signal. The fourth channel is a rectangular area composed of columns 3841 to 7680 and rows 2161 to 4320 in a frame image, as well as row and field synchronization signal.

Operation S20, transmitting the video signal groups to a signal processor, and controlling the signal processor to process the video signal groups;

Operation S30, transmitting the processed video signal groups to a display terminal to display each group of video signal of the processed video signal groups in a corresponding area of the display terminal.

Figure 3:
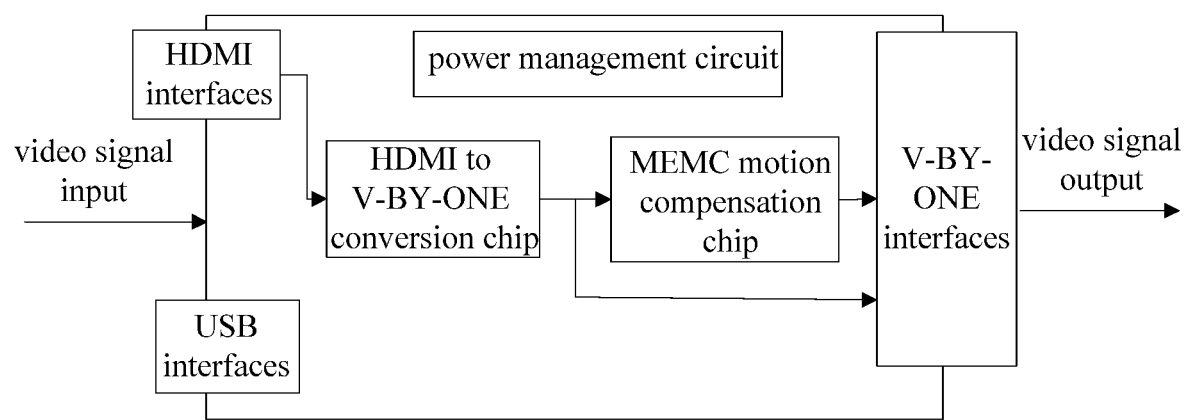
FIG. 3 is a structural diagram of a signal processor according to an embodiment.

In this embodiment, the structure of the signal processor is shown in FIG. 3. The signal processor includes a power management circuit, a HDMI to V-BY-ONE conversion circuit unit, a MEMC digital image motion compensation unit, a digital input interface such as HDMI, USB, etc. and V-BY-ONE digital output interface. The signal processor is connected with the decoder through the HDMI interface, the signal processor is connected to the display through the V-BY-ONE interface. For example, firstly, decode the obtained 8K image source in the original format of RGB 444 by a decoder; then divide the decoded 8K image source into 4 channels of video signal, and re-encode and compress the video signal into 4 channels of video signal in YCbCr 422 format (the video signal may be only divided without re-encoding and compression, keeping the video signal in the original format RGB 444); transmit the signal to a signal processor through 4 HDMI lines respectively; process the 4 channels of video signal with a HDMI to V-By-One conversion circuit unit in the signal processor (e.g., MN 869121 chip is applied) to convert the 4 channels of video signal into 4 channels of video signal that conform to the V-by-one transmission standard; If no motion compensation processing is required for the video signal at this time, transmit the video signal directly to 4 blocks of liquid crystal display screen through 4 channels of V-by-one signal lines, after restoring the 4 channels of YCbCr422 format video signal to 4 channels of RGB444 format video signal; Splice the images of the 4 blocks to a complete 8K image under the action of the synchronous clock. If the motion compensation processing is required for the video signal at this time, transmit 4 channels of YCbCr 422 format video signal to a MEMC digital image motion compensation unit through 4 channels of V-BY-ONE signal lines; after the motion compensation process, the 4 channels of YCbCr 422 format video signal are restored to 4 channels of RGB 444 format video signal; transmit the 4 channels of RGB 444 format video signal to the 4 blocks of the liquid crystal display screen through 4 V-by-one signal lines. Pass the video signal through a synchronous display module before displayed on the display. Since synchronization signal is sent out by the same synchronization clock in the decoding module, our synchronization module may count with the synchronization signal as the counter clock. Assuming that the synchronization clock is 1200 Hz, the count of 10 is $\frac{1}{120}$ s, that is, the duration of image refresh for one frame. When the system works, four counters work at the same time, and refresh one frame image every time count 10, so as to ensure the simultaneous display of four blocks of images. Thereby, the images of the 4 blocks are spliced into a complete 8K image and displayed clearly and completely.

In an alternative embodiment of the present disclosure, an 8K image source in the format of HEVC video compression is obtained, a decoder decodes and divides the 8K image source into 4 channels of video code stream signal in the format of 8 k 60 fps RGB 444 (of course, the video may also be further encoded and compressed to obtain 4 channels of video code stream signal in the format of 8 k 60 fps YCbCr 422 format, on the premise that the video details are retained) and image synchronization signal, transmit the video signal to the HDMI to V-BY-One conversion chip in the processor via the 4 HDMI lines to convert into 4 channels of 8K 60 fps video signal conforming to the V-BY-ONE transmission format; If the display is an 8 k 60 fps liquid crystal panel, 4 channels of 8 k 60 fps video signal conforming to the V-BY-ONE transmission format will be directly transmitted (If the video signal was previously re-encoded and compressed into YCbCr 422 format, the video signal will be restored to RGB 444 format here.) to the corresponding four blocks of the 8 k 60 fps liquid crystal display through 4 V-BY-ONE transmission lines. If the liquid crystal display is an 8 k 120 fps liquid crystal display panel, the MEMC (Motion Compensation) chip is enabled to multiply 4 channels of 8 k 60 fps video signal conforming to the V-BY-ONE transmission format into 4 channels of 8 k 120 fps video signal, and transmit the video signal to the corresponding four blocks of the 8 k 120 fps liquid crystal panel through 4 channels of V-BY-ONE transmission lines. Finally, the video image is displayed completely, clearly and smoothly under the synchronous signal.

In this embodiment, after acquiring a target video signal, decode and divide the target video signal, obtaining the video signal groups with a preset number of channels; transmit the preset number of channels of the video signal groups to a signal processor synchronously and individually; transmit the processed signal groups to the corresponding areas of the display synchronously and individually, so that a high bandwidth video signal may be transmitted through a low bandwidth signal transmission line, and integrity of the video signal in the transmission process is ensured, making display image clear and smooth, detail display perfect, and bringing to audience an excellent viewing experience.

Figure 4:
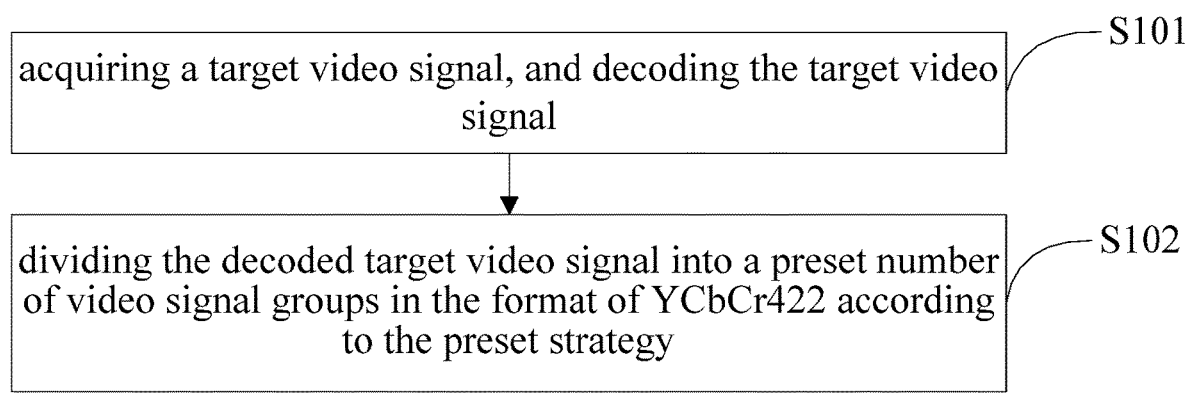
FIG. 4 is a detailed flowchart of operation S10 in FIG. 1.

Referring to FIG. 4, FIG. 4 is a detailed flowchart of operation S10 in FIG. 1.

In this embodiment, operation S10 includes:

operation S101, acquire a target video signal and decode the target video signal;

In this embodiment, the target video signal refers to the ultra-high definition image source corresponding to ultra-high definition television U HDTV, for example, the standard 8K image source of HEVC video compression format. The decoding of the target video signal is completed by a decoder, and there is no restriction on the selection of the decoder, the decoder is determined according to actual needs. For example, 8K 60 fps video code stream signal of RGB 444 format and image synchronization signal are obtained after decoding the standard 8K image source of HEVC video compression format.

Operation S102, dividing the decoded target video signal into groups of preset paths in the format of YCbCr422 according to the preset strategy In this embodiment, the decoded target video signal is preset. Specifically, the preset includes converting the video signal format and dividing the video signal.

In this embodiment, the video signal is converted from RGB 444 format to YCbCr 422 format by a format converter (no restrictions here, the type of format converter is specifically selected according to actual needs). Of course, it may also be converted to other formats. However, since human eyes are more sensitive to luminance signal than chrominance signal (cb, cr), therefore, on the premise that the video details are retained at maximum, the video signal in the original RGB 444 format is resampled and converted into YCbCr 422 format video signal according to a sampling ratio of Y:CB:CR=4:2:2 in the decoder.

In another alternative embodiment of the present disclosure, the video format may not be converted, i.e., the original video format RGB 444 may be retained and the video signal may only be divided.

In this embodiment, video signal dividing is not restricted, dividing to 4 channels for instance, as long as the code stream rate of each channel is made lower than the maximum code stream transmission rate specified by the present transmission protocol (e.g., the maximum code stream transmission rate specified by HDMI 2.0 and V-BY-ONE interface specifications).

In this embodiment, after decoding the original video signal, further convert the format of the decoded video to make the transmission process smoother, divide to make the code stream rate of the video signal to conform to the specifications of the present transmission protocol. The purpose of transmitting high-bandwidth video signal through low-bandwidth signal lines is achieved.

Figure 5:
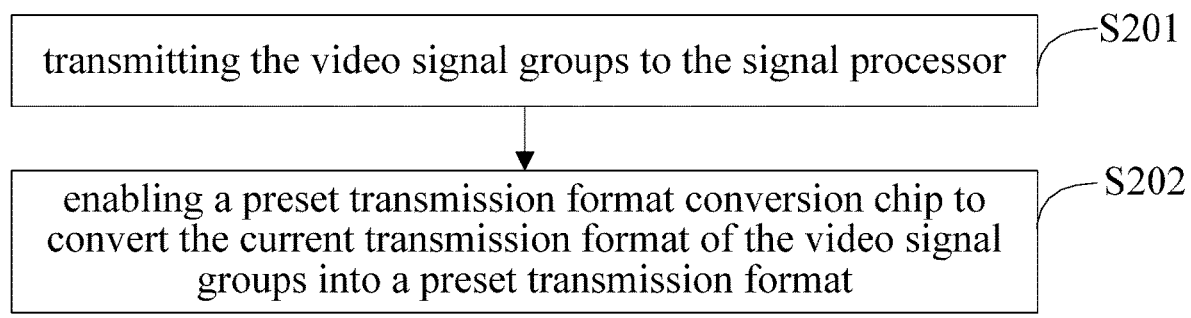
FIG. 5 is a detailed flowchart of operation S20 in FIG. 1 according to the first embodiment.

Referring to FIG. 5, FIG. 5 is a detailed flowchart of operation S20 in FIG. 1 according to the first embodiment.

In this embodiment, operation S20 includes:

Operation S201, transmitting the video signal groups to a signal processor,

Operation S202, enabling a preset transmission format conversion chip to convert the existing transmission format of the video signal groups into a preset transmission format.

In this embodiment, when the signal processor inputs a signal through HDMI line, the video signal transmission format is HDMI. Since the input interface of 8K television is commonly V-BY-ONE, the output interface of the signal processor is V-BY-ONE, and the transmission format of the signal needs to be converted into a transmission format conforming to V-BY-ONE. In this embodiment, the transmission format conversion chip is not restricted, it can be chosen according to actual needs, for example, MN 869121 may be used. The chip can convert HDMI video signal into video signal conforming to the V-BY-ONE transmission standard. And, transmission through the V-BY-ONE transmission protocol can reduce the number of transmission lines and the overall material consumption and cost.

In this embodiment, after the video signal is input to a signal manager, convert the video signal into the video signal conforming to the V-BY-ONE transmission standard by enabling a preset transmission format conversion chip. Thereby, on one aspect, the signal can be transmitted to the display screen through the V-BY-ONE line, on another aspect, the overall consumption is reduced and the cost is saved.

Figure 6:
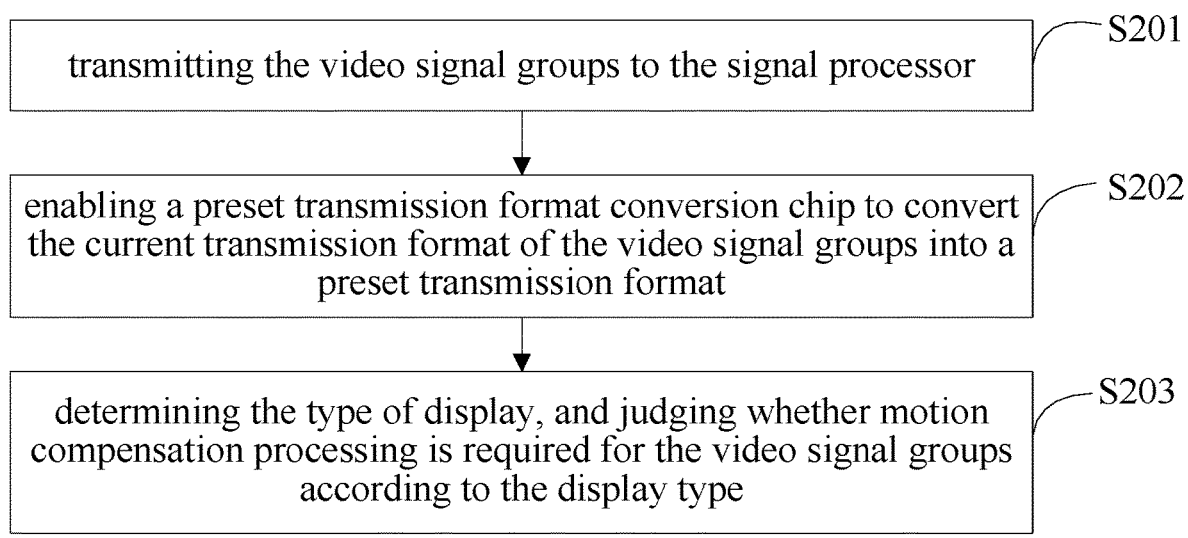
FIG. 6 is a detailed flowchart of operation S20 in FIG. 1 according to the second embodiment.

Referring to FIG. 6, FIG. 6 is a detailed flowchart of operation S20 in FIG. 1 according to the second embodiment.

In this embodiment, after operation S202, the method includes:

S203, determining the type of display, and judging whether motion compensation processing is required for the video signal groups according to the display type.

In this embodiment, the type of display mainly refers to the type of 8K television liquid crystal panel. For example, some are 8 k 60 fps liquid crystal panels and some are 8 k 120 fps liquid crystal panels. Perform motion compensation processing on the video signal groups, the motion compensation process is completed by the MEMC motion compensation processing chip. There is no restriction on the selection of MEMC motion compensation processing chip. According to actual needs, for example, NT 72334 TBG is selected for the process. For example, the original video signal is 8 k 60 fps, and the display screen is an 8 k 60 fps liquid crystal panel, under this situation, there is no need to perform MEMC motion compensation processing on the video signal. If the display screen is an 8K 120 fps liquid crystal display panel at this time, then it is necessary to perform MEMC motion compensation processing on the video signal to obtain 8K 120 fps video signal.

In this embodiment, motion compensation processing on the video signal group makes better display effect of the video signal group on the liquid crystal panel with better performance, further enhance user's viewing experience.

Figure 7:
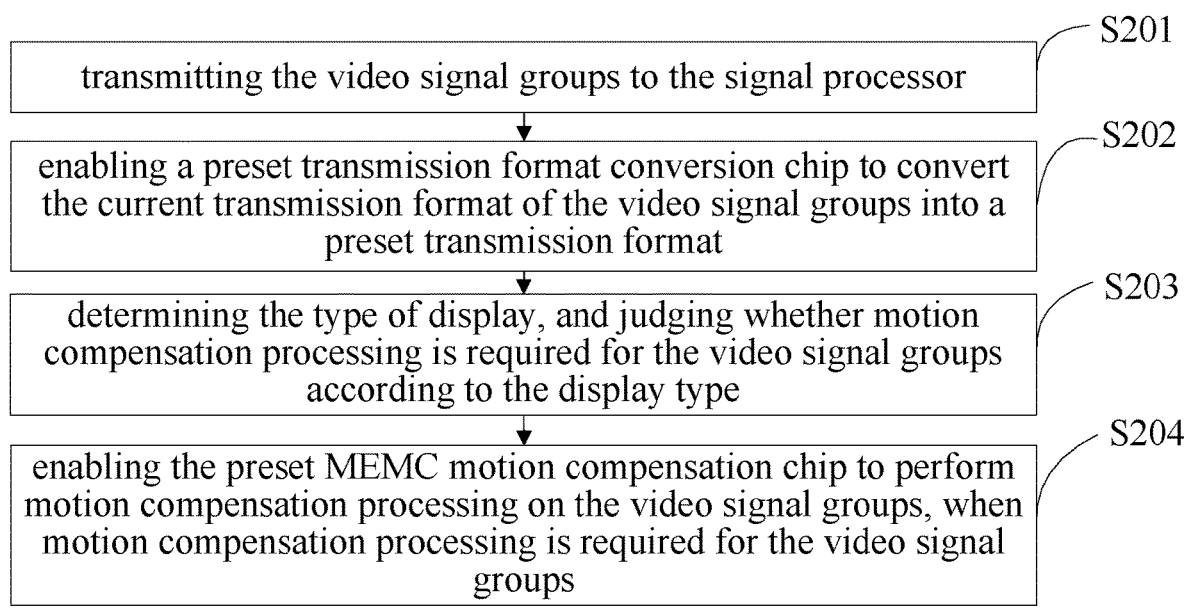
FIG. 7 is a detailed flowchart of operation S20 in FIG. 1 according to the third embodiment.

Referring to FIG. 7, FIG. 7 is a detailed flowchart of operation S20 in FIG. 1 according to the third embodiment.

In this embodiment, after operation S203, the method includes:

Operation S204, when motion compensation processing is required for the video signal group, enabling the preset MEMC motion compensation chip to perform motion compensation processing on the video signal groups.

In this embodiment, when it is necessary to perform motion compensation processing on the video signal group, enabling the preset MEMC motion compensation chip to perform motion compensation processing on the video signal groups. For example, when the video signal group is 8 k 60 fps video signal, it is necessary to output the video signal to the 8 k 120 fps liquid crystal panel. Under this situation, convert 8K 60 fps video signal into 8K 120 fps video signal via the selected NT 72334 TBG motion compensation processing chip, and then output to the corresponding four blocks of the 8K 120 FPS television liquid crystal panel through the V-BY-ONE interface. Splice the images of the four blocks to a complete 8K image under the action of the synchronous clock.

In this embodiment, the MEMC motion compensation chip is added to the liquid crystal screen with higher refresh rate to increase the fps value of the video signal, making the picture clearer and smoother, response effect better than normal, and the definition of the dynamic picture improved.

The disclosure further provides a video signal transmission device.

Figure 8:
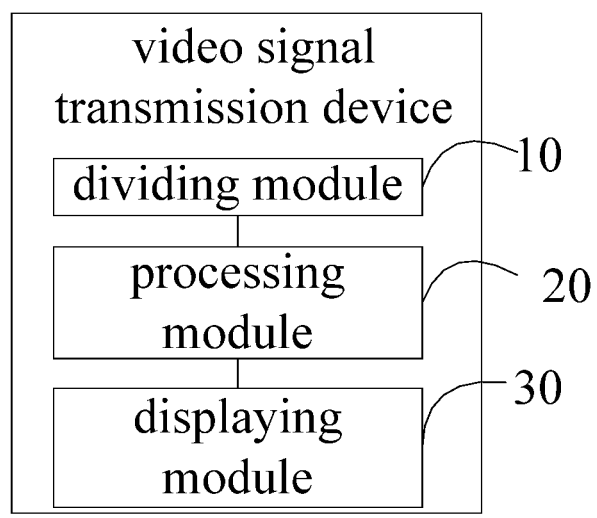
FIG. 8 is a schematic diagram of functional modules of the video signal transmission device according to an embodiment of the present disclosure.

Referring to FIG. 8, FIG. 8 is a schematic diagram of functional modules of the video signal transmission device according to an embodiment of the present disclosure.

In this embodiment, the video signal transmission device includes:

a dividing module 10, configured to acquire a target video signal, decode the target video signal, and divide the decoded target video signal into a preset number of video signal groups according to a preset strategy;

In this embodiment, the target video signal refers to the ultra-high definition image source corresponding to ultra-high definition television UHDTV, such as, a standard 8K image source in the format of HEVC video compression. Ultra-high definition television refers to that according to the proposal of "Ultra-high definition television UHDTV" issued by the International Telecommunication Union (ITU) in May 2012, television with screen physical resolution of 3840×2160 (4 k×2 k) and television with screen physical resolution above 3840×2160 (4 k×2 k) are called Ultra-high definition television. Dividing the decoded target video signal into a preset number of video signal groups according to a preset strategy. The decoded target video signal may be divided into any number of channels, without limitation here, dividing to 4 channels for instance, making the code stream rate of each channel lower than the maximum code stream transmission rate specified by the present transmission protocol (e.g., the specified maximum code stream transmission rate of HDMI 2.0 and V-BY-ONE interface). Since human eyes are more sensitive to luminance signal than chrominance signal (Cb, Cr), Therefore, the video signal in the original RGB 444 format can be resampled into a YCbCr 422 format video signal in the decoder according to the sampling ratio of Y:CB:Cr=4:2:2 while retaining video details to the maximum. That is, 8K video signal in the original RGB 444 format is processed to obtain 4 channels of video signal in YCbCr 422 format (or the original format may not be converted, retaining the original format RGB444).

In this embodiment, when dividing an image signal, flag bits may also be added to the head and tail of each image block during dividing image signal. During signal transmission to the display after dividing, monitor the transmission flag bit of the image block in real time, if there exist the head and tail flag bits of each image, it indicates that no data is lost during signal transmission. If the date is lost, judging whether the number of lost picture frames exceeds a certain value. this value can be judged according to actual needs, For example, when the display is 8K 120 fps, if the number of lost picture frames is less than 120 frames, the influence of frame picture loss on video signal playing can be ignored under this situation. If the number of the lost picture frames is more than 120, it is judged that it will affect the playing image under this situation. Users can be informed by some certain form to check possible problems in the transmission line or other transmission. For example, display a picture after loss of picture frame (i.e. no video signal picture) on the screen to prompt the user that there is a problem in the current video signal transmission and to remind the user to repair the line.

In this embodiment, there is no restriction on signal dividing of image source. The code stream rate of each line after dividing is lower than the maximum code stream rate specified in present interface specifications (e.g., HDMI 2.0, V-BY-ONE). In an alternative embodiment, as shown in FIG. 2, FIG. 2 is a diagram of dividing video signal according to an embodiment of the present disclosure. The 8 k 60 fps ultra-high definition video is decoded by the 8 k decoding module and then divided into 4 channels of RGB 444 format video signal and synchronous clock signal for separate transmission. The first channel is a rectangular area composed of columns 1 to 3840 and rows 1 to 2160 in a frame of image, as well as row and field synchronization signal. The second channel is a rectangular area composed of columns 3841 to 7680 and rows 1 to 2160 in a frame image, as well as row and field synchronization signal. The third way is a rectangular area composed of columns 1 to 3840 and rows 2161 to 4320 in a frame image, as well as row and field synchronization signal. The fourth channel is a rectangular area composed of columns 3841 to 7680 and rows 2161 to 4320 in a frame image, as well as row and field synchronization signal.

A processing module 20, configured to transmit the video signal groups to a signal processor, and control the signal processor to process the video signal groups;

a displaying module 30, configured to transmit the processed video signal groups to a display terminal to display each group of video signal of the processed video signal groups in a corresponding area of the display terminal.

In this embodiment, the structure of the signal processor is shown in FIG. 3. The signal processor includes a power management circuit, a HDMI to V-BY-ONE conversion circuit unit, a MEMC digital image motion compensation unit, a digital input interface such as HDMI, USB, etc. and V-BY-ONE digital output interface. The signal processor is connected with the decoder through the HDMI interface, the signal processor is connected to the display through the V-BY-ONE interface. For example, firstly, decode the obtained 8K image source in the original format of RGB 444 by a decoder; then divide the decoded 8K image source into 4 channels of video signal, and re-encode and compress the video signal into 4 channels of video signal in YCbCr 422 format (the video signal may be only divided without re-encoding and compression, keeping the video signal in the original format RGB 444); transmit the signal to a signal processor through 4 HDMI lines respectively; process the 4 channels of video signal with a HDMI to V-By-One conversion circuit unit in the signal processor (e.g., MN 869121 chip is applied) to convert the 4 channels of video signal into 4 channels of video signal that conform to the V-by-one transmission standard; If no motion compensation processing is required for the video signal at this time, transmit the video signal directly to 4 blocks of liquid crystal display screen through 4 channels of V-by-one signal lines, after restoring the 4 channels of YCbCr422 format video signal to 4 channels of RGB444 format video signal; Splice the images of the 4 blocks to a complete 8K image under the action of the synchronous clock. If the motion compensation processing is required for the video signal at this time, transmit 4 channels of YCbCr 422 format video signal to a MEMC digital image motion compensation unit through 4 channels of V-BY-ONE signal lines; after the motion compensation process, the 4 channels of YCbCr 422 format video signal are restored to 4 channels of RGB 444 format video signal; transmit the 4 channels of RGB 444 format video signal to the 4 blocks of the liquid crystal display screen through 4 V-by-one signal lines. Pass the video signal through a synchronous display module before displayed on the display. Since synchronization signal is sent out by the same synchronization clock in the decoding module, our synchronization module may count with the synchronization signal as the counter clock. Assuming that the synchronization clock is 1200 Hz, the count of 10 is $\frac{1}{120}$ s, that is, the duration of image refresh for one frame. When the system works, four counters work at the same time and refresh one frame every time count 10, so as to ensure the simultaneous display of four blocks of images. Thereby, the images of the 4 blocks are spliced into a complete 8K image and displayed clearly and completely.

In an alternative embodiment of the present disclosure, an 8K image source in the format of HEVC video compression is obtained, a decoder decodes and divides the 8K image source into 4 channels of video code stream signal in the format of 8 k 60 fps RGB 444 (of course, the video can also be further encoded and compressed to obtain 4 channels of video code stream signal in the format of 8 k 60 fps YCbCr 422 format, on the premise that the video details are retained) and image synchronization signal, transmit the video signal to the HDMI to V-BY-One conversion chip in the processor via the 4 HDMI lines to convert into 4 channels of 8 k 60 fps video signal conforming to the V-BY-ONE transmission format; If the display is an 8 k60 fps liquid crystal panel, 4 channels of 8 k 60 fps video signal conforming to the V-BY-ONE transmission format will be directly transmitted (If the video signal was previously re-encoded and compressed into YCbCr 422 format, the video signal will be restored to RGB 444 format here) to the corresponding four blocks of the 8 k 60 fps liquid crystal display through 4 V-BY-ONE transmission lines. If the liquid crystal display is an 8 k 120 fps liquid crystal display panel, the MEMC (Motion Compensation) chip is enabled to multiply 4 channels of 8 k 60 fps video signal conforming to the V-BY-ONE transmission format into 4 channels of 8 k 120 fps video signal, and transmit the video signal to the corresponding four blocks of the 8 k 120 fps liquid crystal panel through 4 channels of V-BY-ONE transmission lines. Finally, the video image is displayed completely, clearly and smoothly under the synchronous signal.

In this embodiment, after acquiring a target video signal, decode and divide the target video signal, obtaining the video signal groups with a preset number of channels; transmit the preset number of channels of the video signal groups to a signal processor synchronously and individually; transmit the processed signal groups to the corresponding areas of the display synchronously and individually, so that a high bandwidth video signal can be transmitted through a low bandwidth signal transmission line, and integrity of the video signal in the transmission process is ensured, making display image clear and smooth, detail display perfect, and bringing to audience an excellent viewing experience.

Figure 9:
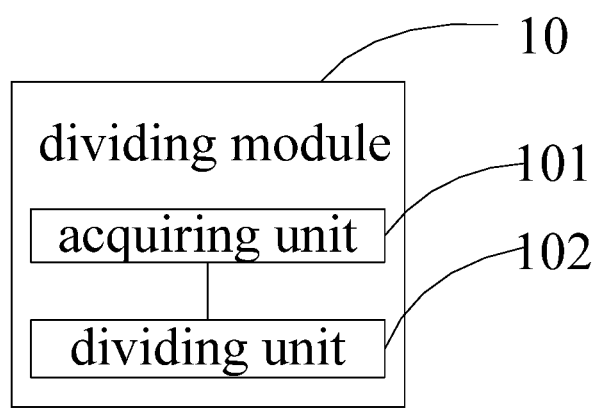
FIG. 9 is a schematic diagram of detailed functional modules of the dividing module 10 in FIG. 8.

Referring to FIG. 9, FIG. 9 is a schematic diagram of detailed functional modules of the dividing module 10 in FIG. 8;

In this embodiment, the dividing module 10 includes:

an acquiring unit 101, configured to acquire a target video signal and decode the target video signal;

In this embodiment, the target video signal refers to the ultra-high definition image source corresponding to ultra-high definition television UHDTV, such as, a standard 8K image source in the format of HEVC video compression. The decoding of the target video signal is completed by a decoder, and there is no restriction on the selection of the decoder, the decoder is determined according to actual needs. For example, 8K 60 fps video code stream signal of RGB 444 format and image synchronization signal are obtained after decoding the standard 8K image source of HEVC video compression format.

a dividing unit 102, configured to divide the decoded target video signal into the preset number of video signal groups in the format of YCbCr422 according to the preset strategy.

In this embodiment, the decoded target video signal is preset, Specifically, the preset includes converting the video signal format and dividing the video signal.

In this embodiment, by a format converter (no restrictions here, the type of format converter is specifically selected according to actual needs). the video signal is converted from RGB 444 format to YCbCr 422 format. Of course, it can also be converted to other formats. However, since human eyes are more sensitive to luminance signal than chrominance signal (Cb, Cr), Therefore, the video signal in the original RGB 444 format can be resampled into a YCbCr 422 format video signal in the decoder according to the sampling ratio of Y:CB:Cr=4:2:2 while retaining video details to the maximum.

In another alternative embodiment of the present disclosure, the video format may not be converted, i.e., the original video format RGB 444 may be retained and the video signal may only be divided.

In this embodiment, video signal dividing is not restricted, dividing to 4 channels for instance, as long as the code stream rate of each channel is made lower than the maximum code stream transmission rate specified by the present transmission protocol (e.g., the maximum code stream transmission rate specified by HDMI 2.0 and V-BY-ONE interface specifications).

In this embodiment, after decoding the original video signal, further convert the format of the decoded video to make the transmission process smoother, divide to make the code stream rate of the video signal to conform to the specifications of the present transmission protocol. The purpose of transmitting high-bandwidth video signal through low-bandwidth signal lines is achieved.

Figure 10:
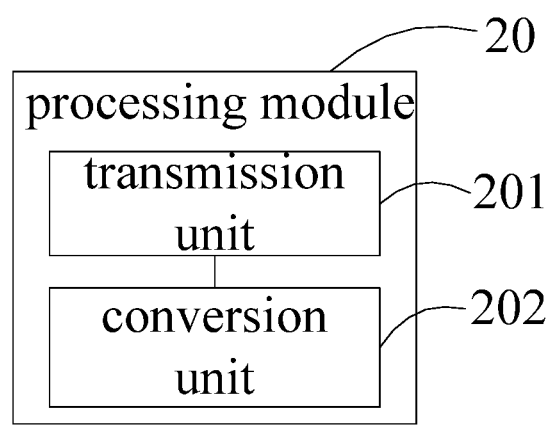
FIG. 10 is a schematic diagram of detailed functional modules of the processing module 20 in FIG. 8 according to the first embodiment.

Referring to FIG. 10, FIG. 10 is a schematic diagram of detailed functional modules of the processing module 20 in FIG. 8 according to the first embodiment.

In this embodiment, the processing module 20 includes:

a transmission unit 201, configured to transmit the video signal groups to a signal processor;

a conversion unit 202, configured to enable a preset transmission format conversion chip to convert the existing transmission format of the video signal groups into a preset transmission format.

In this embodiment, when the signal processor inputs a signal through HDMI line, the video signal transmission format is HDMI. Since the input interface of 8K television is commonly V-BY-ONE, the output interface of the signal processor is V-BY-ONE, and the transmission format of the signal needs to be converted into a transmission format conforming to V-BY-ONE. In this embodiment, the transmission format conversion chip is not restricted, it can be chosen according to actual needs, for example, MN 869121 may be used. The chip can convert HDMI video signal into video signal conforming to the V-BY-ONE transmission standard. And, transmission through the V-BY-ONE transmission protocol can reduce the number of transmission lines and the overall material consumption and cost.

In this embodiment, after the video signal is input to a signal manager, convert the video signal into the video signal conforming to the V-BY-ONE transmission standard by enabling a preset transmission format conversion chip. Thereby, on one aspect, the signal may be transmitted to the display screen through the V-BY-ONE line, on another aspect, the overall consumption is reduced and the cost is saved.

Figure 11:
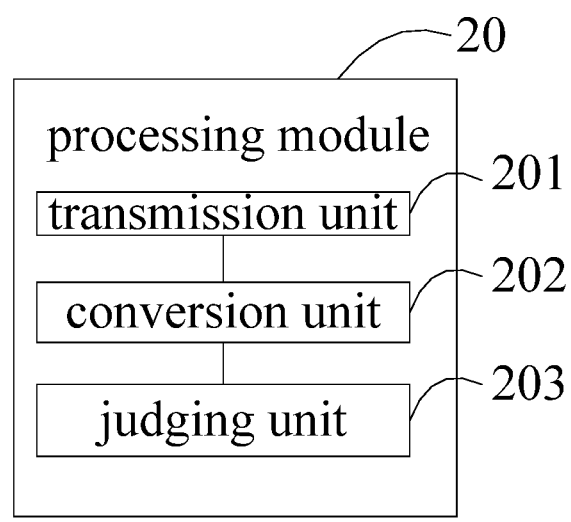
FIG. 11 is a schematic diagram of detailed functional modules of the processing module 20 in FIG. 8 according to the second embodiment.

Referring to FIG. 11, FIG. 11 is a schematic diagram of detailed functional modules of the processing module 20 in FIG. 8 according to the second embodiment.

In this embodiment, the processing module 20 also includes:

a judging unit 203, configured to determine the type of the display, and judge whether motion compensation processing is required for the video signal groups according to the display type.

In this embodiment, the type of display mainly refers to the type of 8K television liquid crystal panel. For example, some are 8 k 60 fps liquid crystal panels and some are 8 k 120 fps liquid crystal panels. Perform motion compensation processing on the video signal groups, the motion compensation process is completed by the MEMC motion compensation processing chip. There is no restriction on the selection of MEMC motion compensation processing chip. according to actual needs, for example, NT 72334 TBG is selected for the process. For example, the original video signal is 8 k 60 fps, and the display screen is an 8 k 60 fps liquid crystal panel, under this situation, there is no need to perform MEMC motion compensation processing on the video signal. If the display screen is an 8K 120 fps liquid crystal display panel at this time, then it is necessary to perform MEMC motion compensation processing on the video signal to obtain 8K 120 fps video signal.

In this embodiment, motion compensation processing on the video signal group makes better display effect of the video signal group on the liquid crystal panel with better performance, further enhance user's viewing experience.

Figure 12:
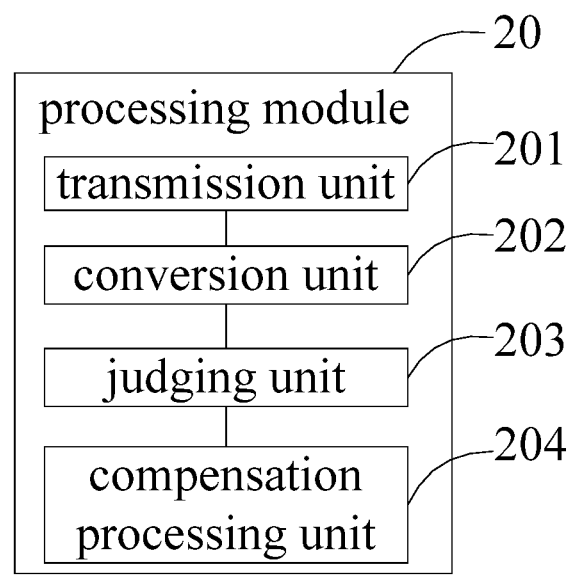
FIG. 12 is a schematic diagram of detailed functional modules of the processing module 20 in FIG. 8 according to the third embodiment.

Referring to FIG. 12, FIG. 12 is a schematic diagram of detailed functional modules of the processing module 20 in FIG. 8 according to the third embodiment.

In this embodiment, the processing module 20 also includes:

a compensation processing unit 204, configured to enable the preset MEMC motion compensation chip to perform motion compensation processing on the video signal groups, when motion compensation processing is required for the video signal group.

In this embodiment, when it is necessary to perform motion compensation processing on the video signal group, enabling the preset MEMC motion compensation chip to perform motion compensation processing on the video signal groups. For example, when the video signal group is 8 k 60 fps video signal, it is necessary to output the video signal to the 8 k 120 fps liquid crystal panel. Under this situation, convert 8K 60 fps video signal into 8K 120 fps video signal via the selected NT 72334 TBG motion compensation processing chip, and then output to the corresponding four blocks of the 8K 120 FPS television liquid crystal panel through the V-BY-ONE interface. Splice the images of the four blocks to a complete 8K image under the action of the synchronous clock.

In this embodiment, the MEMC motion compensation chip is added to the liquid crystal screen with higher refresh rate to increase the fps value of the video signal, making the picture clearer and smoother, response effect better than normal, and the definition of the dynamic picture improved.

The above is only the optional embodiment of the present disclosure and is not therefore limiting the patent scope of the present disclosure. Any equivalent structure or equivalent process change made by taking advantage of the contents of the present specification and drawings, as well as their use in other related technical fields directly or indirectly, is included in the patent protection scope of the present disclosure.

What is claimed is:

1. A video signal transmission method, wherein the video signal transmission method comprises:
   acquiring a target video signal, decoding the target video signal, and dividing the decoded target video signal into a preset number of video signal groups according to a preset strategy;
   transmitting the video signal groups to a signal processor, and controlling the signal processor to process the video signal groups;
   transmitting the processed video signal groups to a display terminal to display each group of video signal of the processed video signal groups in a corresponding area of the display terminal.

2. The video signal transmission method according to claim 1, wherein the operation of acquiring a target video signal, decoding the target video signal, and dividing the decoded target video signal into a preset number of video signal according to preset strategy comprises:
   acquiring a target video signal, and decoding the target video signal;
   dividing the decoded target video signal into a preset number of video signal groups in the format of YCbCr422 according to the preset strategy.

3. The video signal transmission method according to claim 1, wherein the operation of transmitting the video signal groups to a signal processor, and controlling the signal processor to process the video signal groups comprises:
   transmitting the video signal groups to the signal processor;
   enabling a preset transmission format conversion chip to convert the current transmission format of the video signal groups into a preset transmission format.

4. The video signal transmission method according to claim 3, wherein after the operation of enabling a preset transmission format conversion chip to convert the current transmission format of the video signal groups into a preset transmission format, the method comprises:
   determining the type of display, and judging whether motion compensation processing is required for the video signal groups according to the display type.

5. The video signal transmission method according to claim 4, wherein after the operation of determining the type of display and judging whether motion compensation processing is necessary for the video signal groups according to the display type, the method comprises:
   enabling the preset MEMC motion compensation chip to perform motion compensation processing on the video signal groups, when motion compensation processing is required for the video signal groups.

6. A video signal transmission device, wherein the video signal transmission device comprises:
   a dividing device, configured to acquire a target video signal, decode the target video signal, and divide the decoded target video signal into preset number of video signal groups according to a preset strategy;
   a processing device, configured to transmit the video signal groups to a signal processor, and control the signal processor to process the video signal groups; and
   a displaying device, configured transmit the processed video signal groups to a display terminal to display each group of video signal of the processed video signal groups in a corresponding area of the display terminal.

7. The video signal transmission device according to claim 6, wherein, the dividing module comprises:
   an acquiring device, configured to acquire a target video signal and decode the target video signal,
   a dividing device, configured to divide the decoded target video signal into a preset number of video signal groups in the format of YCbCr422 according to the preset strategy.

8. The video signal transmission device according to claim 6, wherein the processing module comprises:
   a transmission device, configured to transmit the video signal groups to a signal processor;
   a conversion device, configured to enable a preset transmission format conversion chip to convert the current transmission format of the video signal groups into a preset transmission format.

9. The video signal transmission device according to claim 8, wherein the processing module further comprises:
   a judging device, configured to determine the type of display, and judge whether motion compensation processing is required for the video signal groups according to the display type.

10. The video signal transmission device according to claim 9, wherein the processing module further comprises:
    a compensation processing device, configured to enable a preset MEMC motion compensation chip to perform motion compensation processing on the video signal groups, when motion compensation processing is required for the video signal groups.

* * * * *